Jan. 10, 1956
C. W. ASPEY
2,730,154
SELF-LOCKING FASTENER HAVING LONGITUDINAL
SPRING KEY DETENT MEANS
Filed July 23, 1951
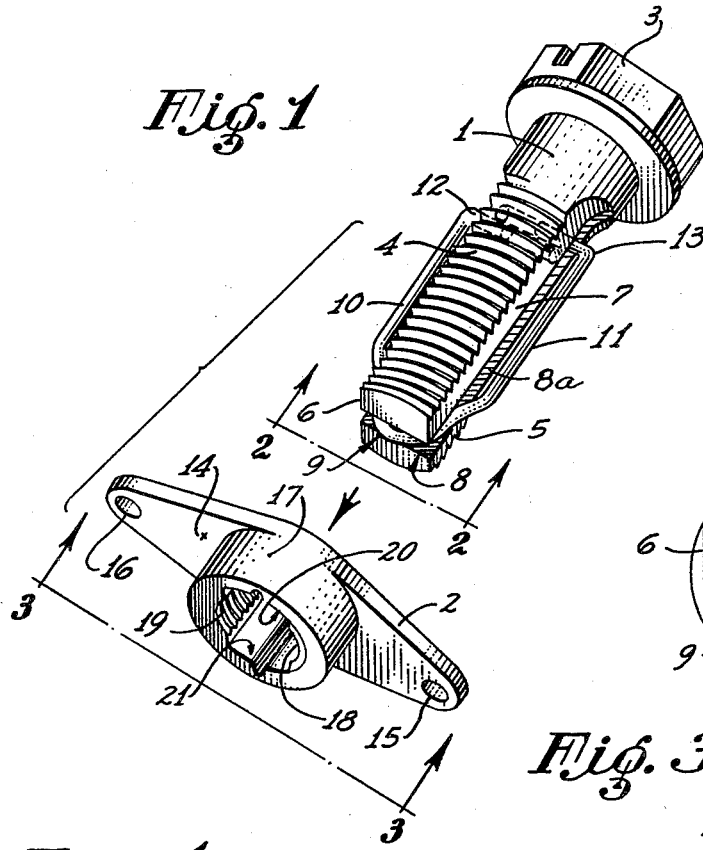
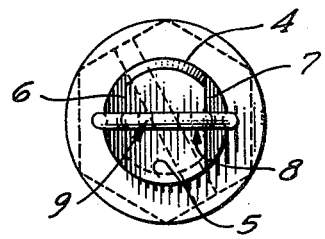
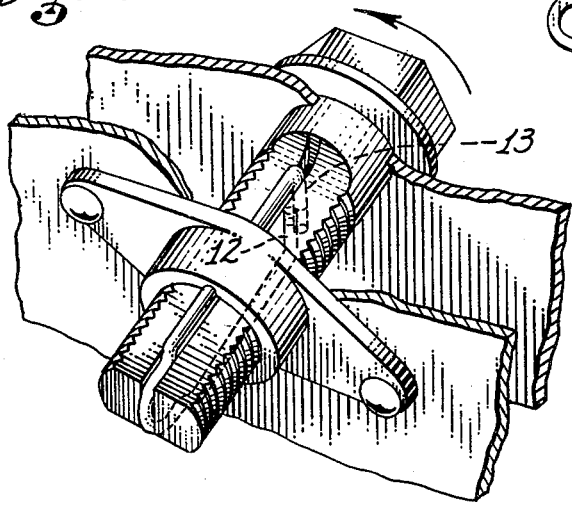
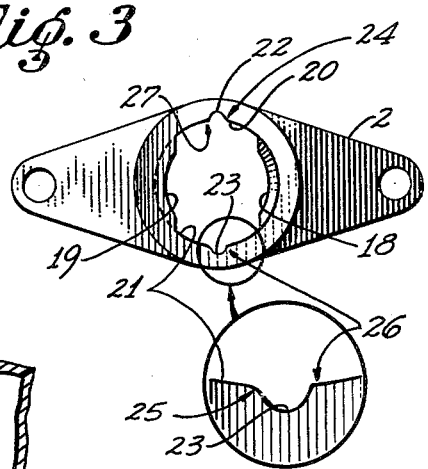
INVENTOR:
Cecil W. Aspey
By Herbert E. Metcalf
His Patent Attorney

United States Patent Office 2,730,154
Patented Jan. 10, 1956

2,730,154

SELF-LOCKING FASTENER HAVING LONGITUDINAL SPRING KEY DETENT MEANS

Cecil W. Aspey, Los Angeles, Calif., assignor to Northrop Aircraft, Inc., Hawthorne, Calif., a corporation of California Application July 23, 1951, Serial No. 238,179

3 Claims. (Cl. 151—8)

This invention relates to a fastener, and particularly to a cam-acting, self-locking fastener adapted for use in applications requiring attaching means of varying length.

Particularly in airframe structure assembly, constantly recurring problems of strength and weight as well as the large variety of types and thicknesses of metals employed make it necessary to stock hundreds of fastening accessories differing only in length; in fact, this one dimension is often so critical, even in fasteners, that screws, bolts and fastener stud-members are often stocked in length increments of .01 inch. This not only complicates the procurement problem, but makes it almost impossible to keep the various lengths from becoming intermixed during handling in stock rooms and in parts bins at assembly stations, and results in unintentional errors and lack of uniformity.

An object of this invention is to provide quick and positive fastening means, simple in design and obvious in operation, having few parts and requiring no special tools or assembly jigs, operable throughout a relatively broad range of length requirements, having a powerful and predetermined amount of cam-type squeezing action through which to draw together the parts being attached, and designed to lock securely at the desired depth and with the optimum degree of tension between the attached members, yet being readily detached without damage to the fasteners or parts, and remaining loosely attached to their respective member parts.

In broad terms, the present invention comprises a bolt-like plug-like member having a suitable head and threaded shank from which portions of the thread have been removed to provide two flat-cut longitudinal sections paralleling each other and equi-distant from the longitudinal axis of the plug-shank, and a receptor-member from which through-sections of thread have been similarly removed, making it possible to insert plug into receptor to any desired depth with the threads of one member sliding past the flat-cut sections of the other, then securing the two members by turning plug to engage the threads, and locking the two together by means of wire springs attached to one member engaging suitable notched detents in the other. The squeezing action exerted by the final engagement of the threads serves to draw together, with any desired degree of tension, any objects positioned between the head of the plug and the face of the receptor-member, holding them in firm attachment until released by a reverse turn of plug which removes springs from detents, disengages threads and permits separation of attaching members.

Many advantages of this novel and improved fastener, in addition to those which are immediately self-evident, will be pointed out or become apparent in the following description of the drawings in which one embodiment of the invention is illustrated, but it is not intended to limit my invention to the particular embodiment herein described since other forms, coming within the scope of the claims, may also be adopted.

Reference is made to the accompanying drawings which illustrate, as previously mentioned, just one preferred mechanical embodiment of the invention:

Figure 1 is a perspective diagram showing details of the plug and receptor fastening members.

Figure 2 is an end view of plug-member at point 2—2.

Figure 3 is an end view of receptor-member taken at point 3—3.

Figure 4 is a perspective diagram showing the plug-member slipped through a hole in one metal surface, and engaged with and locked into receptor-member which, in turn, is riveted to another surface. The surfaces being fastened have been cut away to provide a better view of fastener details.

Figure 1 shows the plug member 1 and receptor-member 2 which comprise this particular mechanical embodiment of my invention. The plug member 1 resembles a conventional threaded bolt in that it is shaped at one end to form a head portion 3 conformed to provide suitable means for driving and turning, but differs from an ordinary bolt in most other respects. The body or shank of the plug-member 1 is provided with two threaded 4 and 5 and two flat-cut 6 and 7 longitudinal surface sections alternately juxtaposed about its peripheral surface with the long edges of the longitudinal sections parallel to each other and to the longitudinal axis of the shaft. Thus the flat-cut surfaces 6 and 7 lie in parallel planes on opposite sides and equi-distant from the longitudinal axis of the plug shaft.

A transverse notch in the threaded end of the plug shank 8 is provided to receive the leading end of a compressible wire spring 9 having sides 10 and 11 bent back and extending substantially parallel to the flat-cut surfaces of the plug-shank, and terminating with inbent ends, 12 and 13 in Figure 4, entering holes positioned perpendicularly to the flat-cut surfaces at a point near the inner termination of the threads on the threaded surface sections. The aforementioned notch is aligned with a lengthwise slot 8a in each flat-cut surface 6 and 7, the spring 9 being forced into this slot 8a to clear the portions of the receptor-member 2 when the fastener is assembled.

The complete plug-member with wire spring installed, is adapted to enter a receptor-member 2, said receptor-member comprising a flanged base 14 having suitable means of attachment 15 and 16 to one of the surfaces or objects to be fastened, and a thicker generally cylindrical body portion 17 through which is a perforation interiorally contoured with alternate threaded 18 and 19 and smoot-cut 20 and 21 longitudinal concave sections similar to those of plug-member. The smoot-cut sections of the receptor-member have longitudinal notches 22 and 23 through-cut from front to back parallel to and equi-distant from the longitudinal axis of the perforation. These notches are formed with rounded shoulders 24 and 25 at the left, and straight sides 26 and 27 perpendicular to the thread at the right as best shown in Figure 3.

As illustrated in Figure 4, the receptor- member is designed to permit entry of the plug-member to any desired depth when said plug-member is inserted with the convex threaded sections thereof disposed adjacent to the smooth-cut sections within the perforation, and said threaded sections of plug and receptor-members, in turn, are designed to mate and engage tightly when plug-member is turned to the right. The plug rotation and thread engagement draws the face of the receptor-member closer to the head of the plug-member and presses together with optimum tension the objects positioned therebetween.

When the threaded sections of the plug and receptor-members are completely engaged, the wire springs 10 and 11, Figure 1, align with and expand into notches 22 and 23, Figure 3, locking the two members firmly in engaged positioning. The straight sides 26 and 27 of notches, Figure 3, make it impossible to turn plug-member beyond the point of maximum thread engagement, yet when plug-member is turned counter-clockwise, the rounded shoulders 24 and 25, Figure 3, of notches press wire springs out of notches and threaded sections disengage, permitting withdrawal of plug-member and release of attached parts.

In many applications such as doors and other closures, the receptor-member will be permanently attached to one surface while the plug-member will be slipped through a hole in the other surface and will be held therein when detached from receptor-member by inbent ends 12 and 13, of wire springs, which will expand beyond the outer diameter of the plug-member and prevent the plug-member from dropping out of hole.

Unlike many other types, fasteners embodying the features of my invention may be attached and disengaged as often as desired without damage to themselves or to parts or objects which they attach.

As has been mentioned, the embodiment illustrated in accompanying drawings is just one of several that might be employed and is intended to be typical rather than specific. For instance, on applications such as interior access doors and instrument panel closures requiring only moderate tension, the head of the plug-member can be a winged or knurled thumb nut. For greater tension the head can be adapted for a Phillips or conventional screw driver, and for even greater tension a hex-nut head together with a special tool of either concave or convex conformation with which to turn and press simultaneously can be employed; and tensile strength could be increased even further by using washers or counter-sunk ferrules to keep the head from breaking through or damaging the objects being fastened.

Similarly, the shear strength of the fastener can be adapted to suit the particular application by deepening the receptor-member and lengthening the plug-member, thereby increasing the area of the engaging threaded sections.

Thus it can be seen that this fastening means is extremely versatile and can be adapted to a multitude of uses in which it will have all of the utility of conventional bolts and nuts and spring type fasteners plus many advantages in application and operation never before available in a single fastener.

What is claimed is:

1. A fastener comprising: a headed bolt and a nut having diametrically opposite longitudinal portions of their threads cut away, each of said cut away portions having a longitudinal groove centered therein, said bolt grooves being connected at one end thereof by a transverse slot in the threaded end of said bolt and being terminated at the other end thereof at radial bores in said bolt, said nut grooves having one rounded longitudinal edge and one normal longitudinal edge with the latter edge disposed inwardly of the former along the thread length; and a generally U-shaped wire spring having a generally semi-circular transverse end section disposed within said transverse bolt slot and generally parallel side sections extending from said end section partially within and compressible into said longitudinal bolt grooves, said side sections terminating in in-bent ends entering and movable within said radial bores in said bolt, said spring side sections being adapted to be partially received in said nut grooves and said normal longitudinal edges of the latter being adapted to prevent said bolt from being turned relative to said nut beyond the point of complete engagement of their respective thread portions, and said rounded edges of said nut grooves being adapted to cam said spring side sections into said bolt grooves when said bolt is turned relative to said nut in a direction to disengage said threaded portions in order to permit said disengaging turning.

2. The structure defined in claim 1 in which the tension of the spring is adapted to urge the side sections thereof outwardly of their respective bolt grooves to thereby move said sections outwardly of the diameter of the bolt thread when the bolt is removed from the nut, whereby the right-angled corners of said sections, formed by the in-bent ends, extend outwardly beyond the edge of a perforation in a part to be fastened through which said bolt is inserted, to thereby secure said bolt to the part while the latter is unfastened.

3. The structure defined in claim 1 wherein the width of the spring end section is less than the outer diameter of the bolt thread, and including short, angularly disposed, intermediate camming spring sections connecting the side sections to said end section.

References Cited in the file of this patent

UNITED STATES PATENTS

| | | |
|---|---|---|
| 365,165 | Campbell | June 21, 1887 |
| 815,497 | Watson | Mar. 20, 1906 |
| 1,442,500 | Van Dyke | Jan. 16, 1923 |
| 1,544,132 | Cook | June 30, 1925 |
| 1,718,171 | Mills | June 18, 1929 |
| 2,402,813 | Harada | June 25, 1946 |
| 2,471,175 | Tubbs | May 24, 1949 |

FOREIGN PATENTS

| | | |
|---|---|---|
| 573,227 | Great Britain | Nov. 12, 1945 |